(No Model.)
E. SHAW.
LATHE CHUCK.
No. 375,011. Patented Dec. 20, 1887.
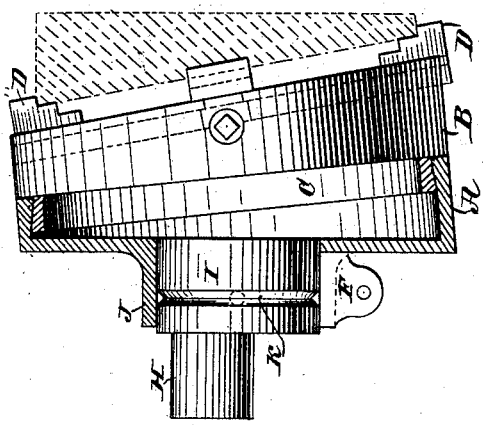
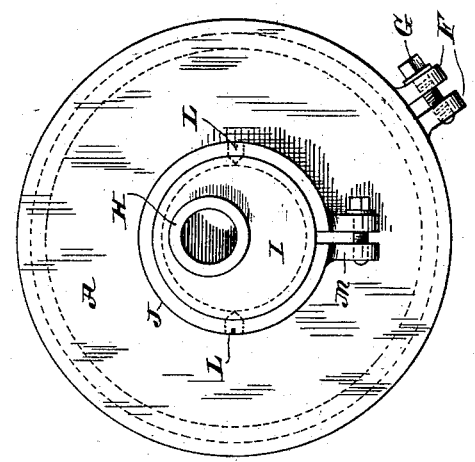
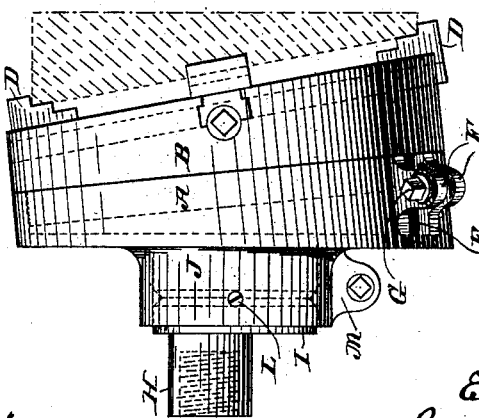
Witnesses:
Robt F Gaylord,
Frank B Murphy,
Inventor
Edgar Shaw
By atty.
Allan M Paige

UNITED STATES PATENT OFFICE.

EDGAR SHAW, OF LYNN, ASSIGNOR TO THE SHAW MANUFACTURING COMPANY, OF BOSTON, MASSACHUSETTS.

LATHE-CHUCK.

SPECIFICATION forming part of Letters Patent No. 375,011, dated December 20, 1887.

Application filed March 12, 1887. Serial No. 230,612. (No model.)

*To all whom it may concern:*

Be it known that I, EDGAR SHAW, of Lynn, in the county of Essex and State of Massachusetts, have invented certain new and useful Improvements in Lathe-Chucks, of which the following is a full, clear, and exact description, reference being had to the accompanying drawings.

This invention has for its object to provide a chuck for lathes and like machines that shall be adapted to grasp and hold pieces of a beveled or wedge-shaped form; also, that shall be adapted to quickly center the work independently of the clamping-jaws—that is, such a chuck will be capable, first, of holding angularly-shaped pieces, and, second, of centering the chuck and the piece it carries upon the mandrel of the lathe or other support that holds the chuck.

The invention consists, first, of a chuck, the body or main part of which is composed of two wedge-shaped sections which are pivotally connected to each other, and are each capable of independent rotation, one of such sections being provided with clamping-jaws and the other having any of the usual means of attachment to a lathe. This feature of invention involves the application to a lathe-chuck of the adjustable support shown in and patented to me by United States Letters Patent No. 333,261, December 29, 1885.

The second feature of invention consists in providing the adjustable wedge-shaped sections with an eccentric bearing, upon which bearing said sections are capable of rotation, there being also a locking device by which the sections can be fixed to such bearing, so as to rotate therewith.

In the drawings, Figure 1 shows a side or elevation view of a chuck embodying my invention. Fig. 2 is an elevation view from the left of Fig. 1, and Fig. 3 shows the same in partial central section.

Referring to the views in detail, A and B represent the sections that compose the body of the chuck. These sections in the present instance are of a hollow cup-like structure, and the one, B, is provided with a bearing-rim, C, upon which the other is sleeved, the bearing-surfaces of these sections being slightly coned or dovetailed together, so that the sections will not readily come apart. These sections, as shown, are in general form or cross-section beveled or wedge-shaped, and, being capable of rotation one on the other, it is manifest that the outer face of the section B, which carries the clamping-jaws D, will have inclined or angular adjustment in all directions within the range represented by the difference in the thickness of the thinner and thicker edges of the sections. The jaws D may be of any suitable construction, and may be operated simultaneously or independently.

E is a slot cut in the cylindrical wall of the section A, and upon each side of this slot are ears F, one of which is threaded and connected to the other by a screw, G. Drawing these ears toward each other causes the outer circular edge of the section to contract and close upon the rim C, and thereby frictionally lock the sections together when they have been suitably adjusted relatively.

H is the stock or tail piece of the chuck, or the part that is designed to screw upon or otherwise attach the chuck to the mandrel of the lathe. This stock-piece is provided with a bearing, I, eccentrically mounted thereon, and upon which the hub J of the chuck rotates, this bearing and the hub being held together by the groove K in the former, and the screws L entering such groove and carried by the latter. The hub J is provided with a frictional lock, M, constructed and operating like the lock E F G of the section A, this lock being for the purpose of fixedly securing the chuck to the stock-piece, so that the chuck will rotate with the mandrel of the lathe.

When it is desired to turn down a part of an angular or wedge-shaped piece, (such as that represented by dotted lines in Fig. 1,) or to drill or otherwise work upon such or a similarly-shaped piece in a lathe, the side or end to be grasped being, for example, inclined to the central line of the lathe, as shown, the piece will be put in the chuck, as usual, and the clamping-jaws shut upon it. The chuck being free to rotate upon the eccentric bearing of its supporting stock-piece, and the beveled sections thereof being loose relatively, the clamped work and the outer section carrying it will then be rotated upon the inner section until the work is brought to the desired inclination, (such, as in the case of the piece illustrated, as would bring its outer face perpendicular to the axis of the lathe,) and the sections are locked together. Effecting this result of course throws the outer section off the center somewhat, and the outer face or end of the work will be still farther away from the line between the centers of the lathe; but by now simply rotating the chuck upon its eccentric bearing the work will be quickly and readily brought to the center, and upon fixing the chuck to the bearing the work is in position to be operated upon.

When it is desired to use the chuck to hold pieces that do not require the clamping-jaws to be angularly positioned, the beveled sections may be set with their thicker edges diametrically opposite, and the chuck may be fixed on the eccentric bearing at the common center, when the chuck will be in the same operable condition as that of an ordinary chuck, and may be used in the same way.

Although the eccentric bearing is preferably used to center the work thrown off the axis of the lathe by adjusting the wedge-sections, the presence of such bearing for such purpose is not imperative, as the centering of the work may be effected by adjusting the clamping-jaws in the manner practiced with the present form of chucks, and well understood by those acquainted with the use of the same. It follows, therefore, that the eccentric bearing is not essential to the operation of the wedge-shaped sections, and I do not confine myself to its use in combination therewith. I prefer, however, to construct the chuck with both the eccentric bearing and the wedge shaped sections, as they operate conjointly to make the chuck more efficient.

The means here shown for connecting and locking the beveled sections may be changed in various ways, as illustrated in the patent above referred to, and also in an application of mine of even date herewith, Serial No. 230,610, especially directed to such locking devices.

What is claimed as new is—

1. A chuck composed of two pivotally-connected and independently-rotatable wedge-shaped sections, one section being provided with clamping-jaws and the other section having means of attachment to a lathe-mandrel or similar support.

2. A chuck composed of two pivotally-connected and independently-rotatable wedge-shaped sections, a locking mechanism by which the sections are fixed to each other, clamping-jaws borne upon one of the sections, and means of attachment to a lathe-mandrel or like support carried upon the other section.

3. In a chuck, the combination of two pivotally-connected and independently-rotatable wedge-shaped sections, clamping-jaws borne upon one of said sections, a locking mechanism for fixedly securing the sections to each other, an eccentric connection for attaching the chuck to a lathe and pivotally attached to the other of said sections, and a locking mechanism for fixedly securing said eccentric connection to its section.

EDGAR SHAW.

Witnesses:
 HENRY L. WARNER,
 JAMES J. MYERS.